United States Patent

[11] 3,545,406

| [72] | Inventor | Denis L. Osborn |
| | | Hicksville, Ohio |
| [21] | Appl. No. | 741,961 |
| [22] | Filed | July 2, 1968 |
| [45] | Patented | Dec. 8, 1970 |
| [73] | Assignee | National Service Industries, Inc. |
| | | Atlanta, Georgia |
| | | a corporation of Delaware |

[54] BREEDER CAGE
3 Claims, 5 Drawing Figs.

[52] U.S. Cl. ..................................................... 119/17, 119/48
[51] Int. Cl. ..................................................... A01k 31/00
[50] Field of Search .......................................... 119/17, 18, 48

[56] References Cited
UNITED STATES PATENTS

| 1,506,570 | 8/1924 | Dean | 119/17 |
| 1,812,598 | 6/1931 | Macomber | 119/17 |
| 2,612,862 | 10/1952 | Ipsen | 119/18 |
| 3,274,972 | 9/1966 | Keen et al. | 119/48 |
| 3,311,087 | 3/1967 | Graves | 119/18 |

*Primary Examiner*—Hugh R. Chamblee
*Attorney*—Owen & Owen

ABSTRACT: A breeder cage having a top, a bottom, opposed sidewalls, a rear wall and a front wall. The front wall has a gate opening and a rectangular gate is provided for opening and closing the opening. A pair of resisting detents are provided on the gate which must be forced over a portion of the front wall when the gate is moved to its open position. A plurality of floor support members having arcuate upper surfaces are positioned beneath and adjacent the bottom. Each floor support member is fastened to the front wall by a hanger and to the rear wall by an integral hook. Adjacent ones of the floor support members serve as force reaction members for the span portion of the bottom which is located between the adjacent floor support members.

PATENTED DEC 8 1970
3,545,406
SHEET 1 OF 2
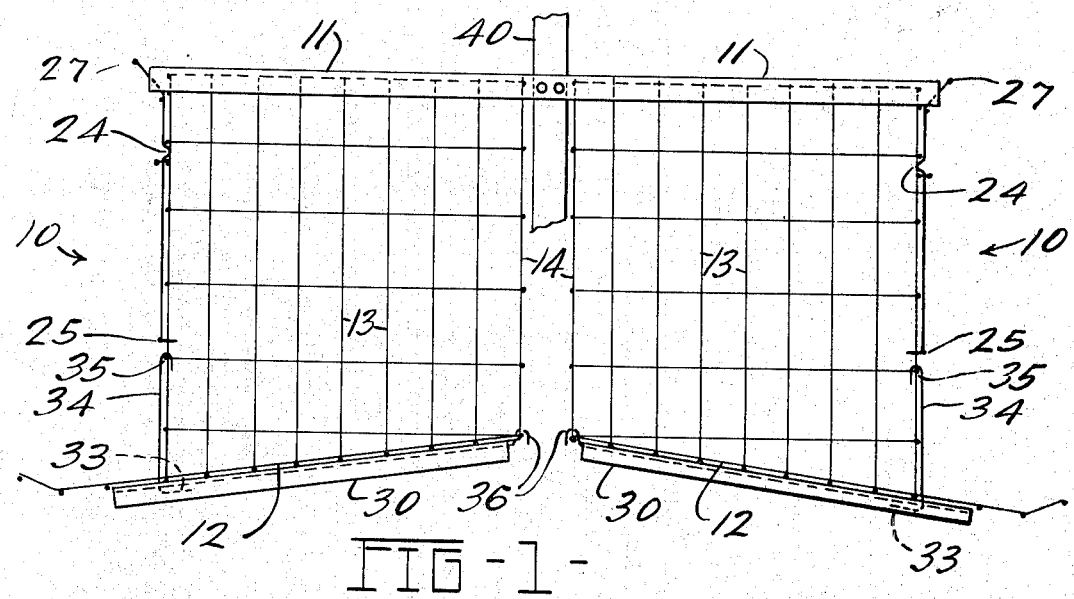
FIG-1-
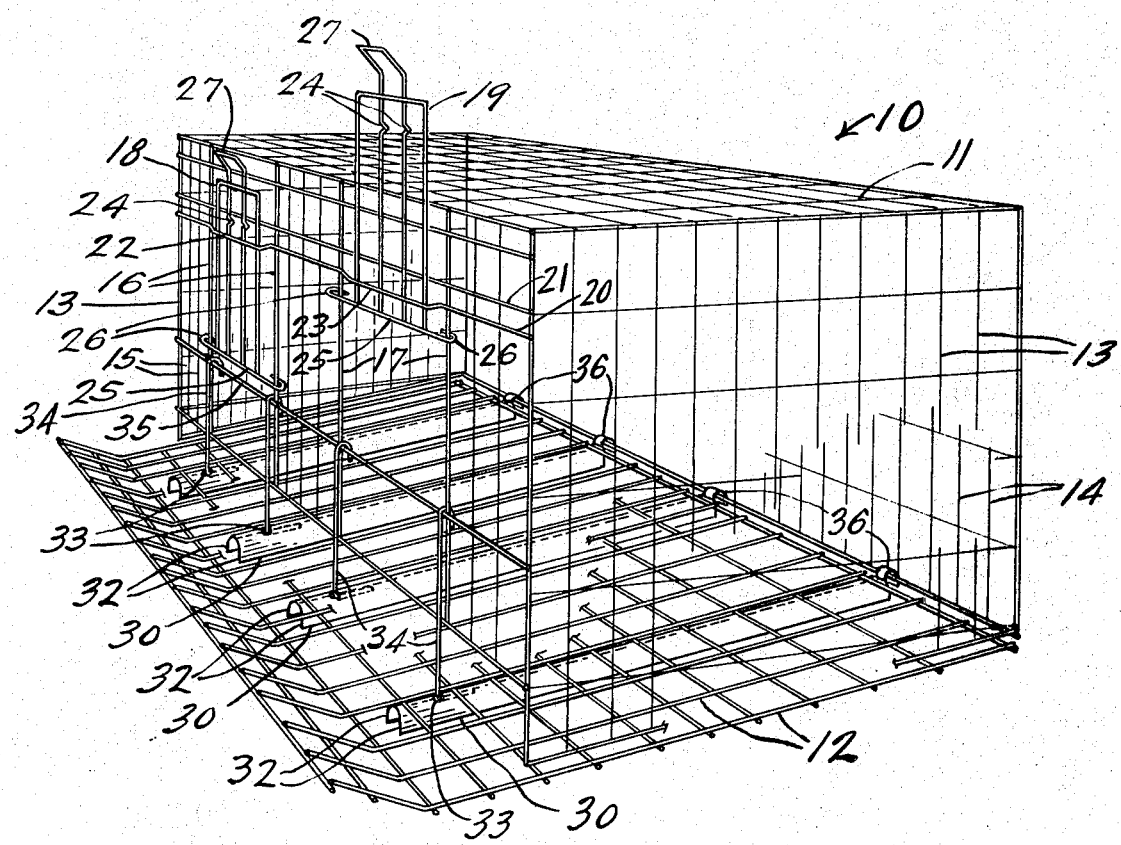
FIG-2-
INVENTOR:
DENIS L. OSBORN.
BY
*Owen Owen*
ATT'YS.

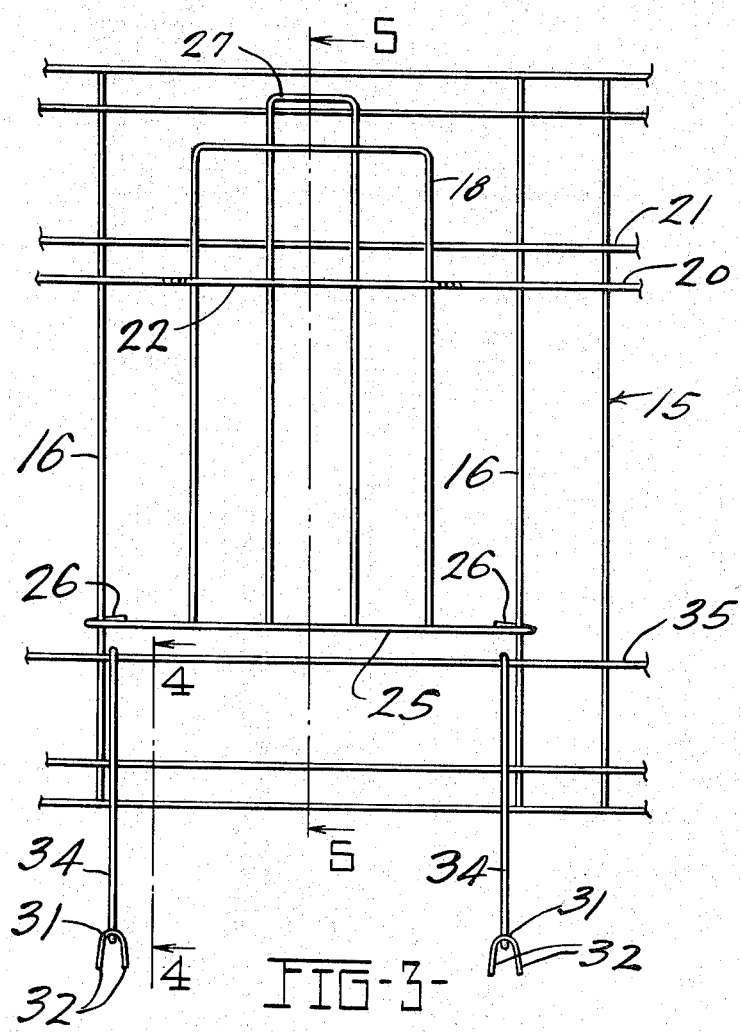
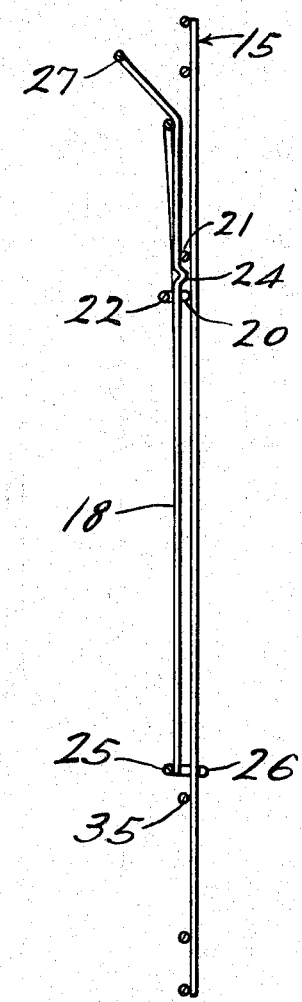
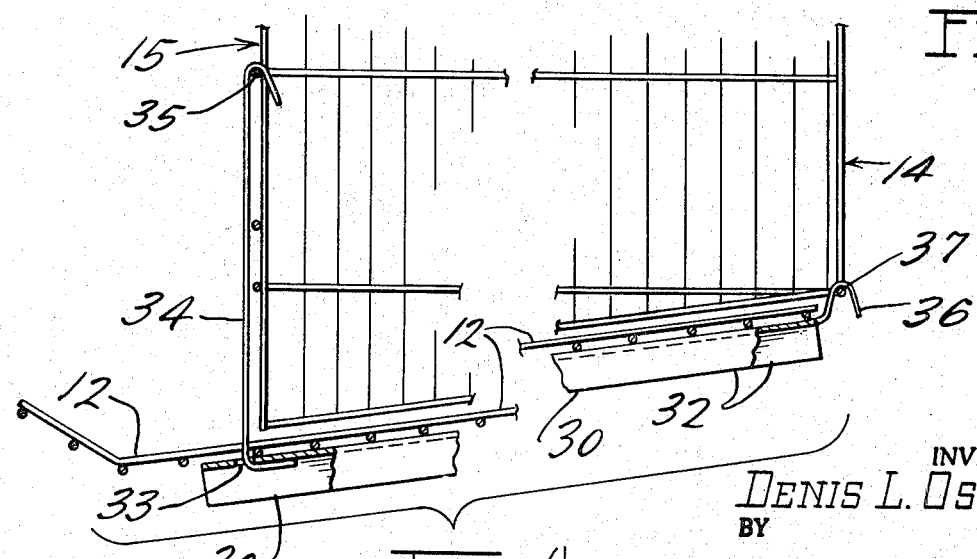

3,545,406

BREEDER CAGE

BACKGROUND OF THE INVENTION

Large poultry operations have become relatively common in recent years. Poultry houses having controlled atmospheres and automated equipment, such as automated egg collection mechanisms, are well known in the art. This type of poultry house often utilizes cage systems which house as many as 30,000 birds.

While various types of elevated or suspended cage structures have been developed, such prior art cage structures were not suitable for controlled breeding purposes. This created a problem in commercial poultry operations.

SUMMARY OF THE INVENTION

The present invention solves the prior art problem by providing a suitable breeding cage structure.

The breeding cage, according to the present invention, is particularly adaptable to large poultry operations. Each cage is generally rectangular in shape, having a top, a bottom, opposed sidewalls, a rear wall and a front wall. The front wall defines one or more gate openings and a rectangular gate is provided for opening and closing each such opening. A pair of resisting detents are provided on each of the gates. The detents must be forced over a portion of the front wall when the gate is moved to its open position. A plurality of floor support members having arcuate upper surfaces are positioned beneath and adjacent the bottom of the cage. Each floor support member is fastened to the front wall by a hanger and to the rear wall by an integral hook. Adjacent ones of the floor support members serve as force reaction members for the span portion of the bottom which is located between the adjacent floor support members.

It is the primary object of the present invention to provide an improved breeder cage structure.

BRIEF DESCRIPTION OF THE DRAWINGS

FIG. 1 is a side elevational view of two cages, according to the present invention;

FIG. 2 is a perspective view of a breeder cage according to the present invention;

FIG. 3 is a fragmentary elevational view of a portion of the breeder cage shown in FIG. 2 and showing the gate means in detail;

FIG. 4 is a fragmentary, side elevational view, with parts broken away for clarity, showing in detail a floor support member and its connecting means; and FIG. 5 is a sectional view taken along the line 5—5 of FIG. 3.

DESCRIPTION OF THE PREFERRED EMBODIMENT

A breeder cage, according to the present invention, is generally indicated in FIGS. 1 and 2 by the reference number 10. The breeder cage 10 includes a top 11, an inclined bottom 12, opposed sidewalls 13, a rear wall 14, and a front wall 15.

The front wall 15 has a pair of rectangular gate openings 16 and 17. Vertically movable gates 18 and 19, which in the present embodiment are rectangular, are adapted to close the gate openings 16 and 17. The front wall 15 of the cage 10 includes a pair of horizontal cage bars 20 and 21 located immediately above the gate openings 16 and 17. The lower cage bar 20 has a pair of outwardly extending gate receiving sections 22 and 23 (see FIG. 2). The gate 18 extends between the gate receiving section 22 of the lower cage bar 20 and the upper cage bar 21 while the gate 19 extends between the gate receiving section 23 of the lower cage bar 20 and the upper cage bar 21. Each of the gates 18 and 19 has a pair of inwardly extending resisting detents 24. When either of the gates 18 and 19 is moved from its lower position (illustrated by gate 18 in FIG. 2) to its upper portion (illustrated by gate 19 in FIG. 2) the detents 24 must be forced over the uppermost cage bar 21. The detents 24 serve as resisting means for retaining the gates 18 and 19 in their lower positions. This feature prevents large birds, or other animals, from forcing the gates 18 and 19 upwardly.

At their lower ends, each of the gates 18 and 19 includes a lower horizontal bar 25. The bar 25 has guide loops 26 at its extremes which engage vertical bars of the front wall 15 of the cage 10. The guide loops 26 guide the gates 18 and 19 in a vertical path as they are moved from their lower positions to their upper positions. The gates 18 and 19 also have outwardly extending U-shaped handles 27 at their upper ends.

Referring to FIGS. 2 and 4, a plurality of floor support members 30 having arcuate upper surfaces are positioned beneath the bottom 12 of the cage 10. In the present embodiment, each of the floor support members 30 has an inverted U-shaped cross section including a central curved portion 31 and two downwardly extending leg portions 32. The floor support members 30 extend between the front wall 15 and the rear wall 14 of the cage 10 and are spaced at predetermined intervals of between 9 inches and 18 inches. Adjacent ones of the floor support members 30 serve as force reaction members for the span portion of the bottom 12 which is located between the adjacent floor support members 30. The floor support members 30 are important features of the present invention. The arcuate or convex upper surfaces of the support members 30 prevent the accumulation of droppings.

The members 30 are fastened to the front wall 15 and the rear wall 14 of the cage 10 so that the bottom 12 is securely supported. Referring to FIG. 4, each of the floor support members 30 has a top opening 33, adjacent its front end, which receives a hanger 34. The hanger 34 is in turn connected to a front horizontal cage bar 35 which is a part of the front wall 15 of the cage 10. Each of the floor support members 30 also has an integral hook 36 at its rear end. The hook 36 is fastened over a horizontal cage bar 37 which is a part of the rear wall 14 of the cage 10.

Referring to FIG. 1, often the breeder cages 10 are supported by vertical mounting members 40 or by other suitable means which suspend the cages 10 above the floor elevation. It has been found that a breeder cage 10 including the spaced floor support members 30 provide a much improved breeding cage structure.

While the present invention has been disclosed in connection with a specific arrangement of parts and with respect to a preferred embodiment, it should be expressly understood that numerous modifications and changes may be made without departing from the scope of the appended claims.

I claim:

1. A breeder cage comprising, in combination, a top, a bottom, opposed sidewalls, a rear wall, a front wall having at least one gate opening defined therein, gate means for closing said gate opening, a plurality of rigid floor support members positioned beneath and adjacent said bottom at predetermined spaced intervals, each of said floor support members extending beyond said front wall and to said rear wall, each of said floor support members having a convex upper surface positioned adjacent said bottom and a pair of parallel sides extending downwardly from said convex upper surface, an integral hook positioned at the rear end of said support member and a retaining hole defined adjacent the front end of said support member, an L-shaped hanger having a lower end received in such retaining hole and an upper end attached to said front wall of said cage, said integral hook being connected to said rear wall of said cage, whereby adjacent units of said floor support members serve as force reaction members for the span portion of said bottom which is located between said adjacent units of said floor support members.

2. A breeder cage, according to claim 1, wherein said front wall of said cage includes a pair of horizontal cage bars above each of said cage openings, the lowest of said cage bars defining a gate receiving section, and wherein said gate means includes at least one rectangular gate, said gate being vertically movable between a lower position wherein such gate opening is closed and an upper position wherein such gate opening is open, said gate extending between said gate receiving section of the lowest of said cage bars and the uppermost one of said cage bars, guide means for guiding the vertical movement of said gate, resisting means for retaining said gate in said lower position and a handle mounted adjacent the uppermost end of said gate.

3. A breeder cage, according to claim 1, wherein said predetermined spaced interval is between 9 inches and 18 inches.